US012786812B2

(12) United States Patent
Zhou et al.

(10) Patent No.: US 12,786,812 B2
(45) Date of Patent: Nov. 3, 2026

(54) CELL GLOBAL IDENTIFIER CONFIGURATION METHOD AND APPARATUS, AND STORAGE MEDIUM

(71) Applicant: DATANG MOBILE COMMUNICATIONS EQUIPMENT CO., LTD., Beijing (CN)

(72) Inventors: Ye Zhou, Beijing (CN); Jiancheng Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 882 days.

(21) Appl. No.: 18/015,944

(22) PCT Filed: Jun. 22, 2021

(86) PCT No.: PCT/CN2021/101380

§ 371 (c)(1),
(2) Date: Jan. 12, 2023

(87) PCT Pub. No.: WO2022/012278

PCT Pub. Date: Jan. 20, 2022

(65) Prior Publication Data

US 2023/0276315 A1 Aug. 31, 2023

(30) Foreign Application Priority Data

Jul. 13, 2020 (CN) ......................... 202010671483.3

(51) Int. Cl.
*H04W 36/00* (2009.01)
*H04W 36/08* (2009.01)

(52) U.S. Cl.
CPC ....... *H04W 36/0061* (2013.01); *H04W 36/08* (2013.01)

(58) Field of Classification Search
CPC ............ H04W 36/0061; H04W 36/08; H04W 36/087; H04W 24/02; H04W 76/11;
(Continued)

(56) References Cited

U.S. PATENT DOCUMENTS

2018/0376380 A1 12/2018 Leroux
2020/0120724 A1 4/2020 Vaidya et al.
(Continued)

FOREIGN PATENT DOCUMENTS

CN 109150562 A 1/2019
CN 109246796 A 1/2019
(Continued)

OTHER PUBLICATIONS

Ericsson,"Intra-gNB-CU mobility procedures",3GPP TSG-RAN WG3 #97bis, Prague, Sep. 2017, total 7 pages, R3-173967.
(Continued)

*Primary Examiner* — Marisol Figueroa
(74) *Attorney, Agent, or Firm* — Kilpatrick Townsend & Stockton LLP

(57) ABSTRACT

Disclosed are a cell global identifier configuration method and apparatus, and a storage medium, for use in solving the problem present in the prior art that the configuration of global identifiers for mobile DUs is complex in operation and error prone. The method includes a target CU configuring a first global identifier for a cell managed by a DU, the first global identifier being a global identifier used by the cell after the DU migrates to the target CU; and sending the first global identifier to the DU.

6 Claims, 9 Drawing Sheets

(58) Field of Classification Search
CPC ... H04W 84/047; H04W 88/085; H04W 8/26; H04W 36/0072
See application file for complete search history.

(56) References Cited

U.S. PATENT DOCUMENTS

| | | | | |
|---|---|---|---|---|
| 2021/0152515 | A1* | 5/2021 | Akl | H04W 40/22 |
| 2021/0345206 | A1* | 11/2021 | Akl | H04W 48/16 |
| 2023/0145711 | A1* | 5/2023 | Koskinen | H04W 36/0072<br>370/329 |

FOREIGN PATENT DOCUMENTS

| | | | | |
|---|---|---|---|---|
| CN | 109729529 | A | 5/2019 | |
| CN | 110536482 | A | 12/2019 | |
| CN | 110536483 | A | 12/2019 | |
| WO | WO-2021098085 | A1 * | 5/2021 | H04W 36/38 |
| WO | WO-2022009093 | A1 * | 1/2022 | H04W 24/02 |

OTHER PUBLICATIONS

Qualcomm Inc et al.,"IAB inter-CU Topology Adaptation for Arch 1a", 3GPP TSG-RAN WG3 Meeting #102, Spokane, WA, USA, Nov. 12-16, 2018, total 9 pages, R3-186456.
CATT,"(TP for NR_IAB BL CR for TS 38.401) Inter-CU IAB-node migration", 3GPP TSG-RAN WG3 #105bis, Chongqing, China, Oct. 14-18, 2019, total 9 pages, R3-195365.
3GPP TS 38.473 V16.1.0, 3rd Generation Partnership Project; Technical Specification Group Radio Access Network; NG-RAN; F1 application protocol (F1AP) (Release 16), total 240 pages, Mar. 2020.

* cited by examiner

CELL GLOBAL IDENTIFIER CONFIGURATION METHOD AND APPARATUS, AND STORAGE MEDIUM

CROSS REFERENCE TO RELATED APPLICATIONS

The present application is a National Stage of International Application No. PCT/CN2021/101380, filed on Jun. 22, 2021, which claims the priority of the Chinese patent application No. 202010671483.3 filed to China National Intellectual Property Administration on Jul. 13, 2020, the entire contents of which are incorporated herein by reference.

FIELD

The present application relates to the field of mobile communication, in particular to a cell global identifier configuration method and apparatus, and a storage medium.

BACKGROUND

In the field of mobile communication, a traditional mobile communication base station is usually fixed on the ground, while some mobile communication base stations (such as base stations fixed on a satellite, an aircraft, a train, and the like) that are not fixed on the ground can play a greater role in some scenarios (such as marine communication, and remote area communication).

In order to minimize the impact of mobility of the base station on a communication core network, the industry proposes to reuse an existing "separate gNB" design in a new radio technology. That is, a radio access network logical node gNB is divided into two parts: a central unit (CU) and distributed units (DUs). The function of the DUs is similar to that of the base station, and is to directly control a wireless cell. In a scenario where a base station not fixed on the ground needs to be deployed, the DUs are deployed on mobile vehicles such as the satellite, the trains, and the aircraft, and the CU is deployed on the ground.

In the prior art, a cell global identifier (CGI) is directly configured by a network management and notified to the DU. For a routing purpose, several highest bits of the CGI must be strictly equal to a global unique identifier of the gNB to which it belongs. However, for the DU with mobility, it is necessary to frequently migrate between the different CUs. Since the CUs correspond to the gNB one by one, it also means that the gNB to which the DU belongs changes frequently, which makes the network management have to configure the CGI for the mobile DU frequently. This configuration process is complex in operation and prone to causing errors such as CGI allocation conflict.

In view of this, how to configure the global identifier quickly and accurately for the mobile DU has become a problem urgent to be solved.

SUMMARY

The present application provides a cell global identifier configuration method and apparatus, and a storage medium, for use in solving the problem present in the prior art that configuration of a global identifier for a mobile DU is complex in operation and error prone.

In one embodiment, in order to solve the above problem, a cell global identifier configuration method provided by an embodiment of the present application is performed by a target CU. The configuration method is as follows: configuring a first global identifier for a cell managed by a DU, and the first global identifier is a global identifier used by the cell after the DU migrates to the target CU; and sending the first global identifier to the DU.

In a possible implementation, the sending the first global identifier to the DU includes: sending a first interface message to the DU, and the first interface message includes the first global identifier; or sending a second interface message to a source CU, and the source CU sends the first global identifier to the DU through a third interface message, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the second global identifier is obtained in the a following mode: receiving a migration request sent by the source CU, and obtaining the second global identifier from the migration request; or receiving a fourth interface message sent by the DU, and obtaining the second global identifier from the fourth interface message, and the fourth interface message is used to establish a logical interface between the DU and the target CU, and the first interface message is used to confirm the logical interface.

In a possible implementation, after the sending the first global identifier to the DU, the configuration method further includes: sending, in a condition that the second global identifier is obtained from the fourth interface message, the corresponding relationship to the source CU, and when executing handover for each user equipment served by the cell, the source CU indicates the first global identifier which is correct according to the second global identifier used by a cell to which the user equipment is currently connected.

In one embodiment, a cell global identifier configuration method provided by an embodiment of the present application is performed by a DU. The configuration method includes: receiving a first global identifier configured by a target CU for a cell managed by the DU, and the first global identifier is a global identifier used by the cell after the DU migrates to the target CU.

In a possible implementation, the receiving the first global identifier configured by the target CU for the cell managed by the DU includes: receiving a first interface message sent by the target CU, and the first interface message carries the first global identifier; or receiving a third interface message sent by a source CU, and the third interface message carries the first global identifier obtained from a second interface message, the second interface message is sent by the target CU to the source CU, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, before the receiving the first global identifier configured by the target CU for the cell managed by the DU, the configuration method further includes: receiving a migration indication sent by the source CU, and the migration indication is used to indicate migration from the source CU to the target CU; and sending a fourth interface message to the target CU, and the fourth interface message includes a second global identifier, the fourth interface message is used to establish a logical interface between the DU and the target CU, and the first interface message is used to confirm the logical interface.

In a possible implementation, after the receiving the first global identifier configured by the target CU for the cell managed by the DU, the configuration method further includes: sending a corresponding relationship between the first global identifier and the second global identifier to the source CU, and when executing handover for each user equipment served by the cell, the source CU indicates the first global identifier which is correct according to the second global identifier used by a cell to which the user equipment is currently connected, and the second global identifier is a global identifier used by the cell before the DU migrates to the target CU.

In a possible implementation, the configuration method further includes: changing a global identifier in a system information broadcast of the cell to the first global identifier after the DU migrates to the target CU.

In one embodiment, a cell global identifier configuration method provided by an embodiment of the present application is performed by a source CU. The configuration method includes: sending a migration request to a target CU to migrate a DU to the target CU, and the target CU configures a first global identifier for a cell managed by the DU, and the first global identifier is a global identifier used by the cell after the DU migrates to the target CU.

In a possible implementation, after the sending the migration request to the target CU to migrate the DU to the target CU, the configuration method further includes: receiving a second interface message sent by the target CU; and obtaining the first global identifier from the second interface message, and sending a third interface message to the DU by carrying the first global identifier in the third interface message.

In a possible implementation, the second interface message includes a corresponding relationship between the first global identifier and a second global identifier, and the second global identifier is a global identifier used by the cell before the DU migrates to the target CU.

In a possible implementation, after the sending the migration request to the target CU to migrate the DU to the target CU, the configuration method further includes: receiving a corresponding relationship between the first global identifier and a second global identifier sent by the DU or the target CU, and the second global identifier is a global identifier used by the cell before the DU migrates to the target CU; and indicating, when executing handover for each user equipment served by the cell, the first global identifier which is correct according to the second global identifier used by a cell to which the user equipment is currently connected.

One embodiment of the present application provides a cell global identifier configuration apparatus, applied to a target CU, and including: a configuring device, configured to configure a first global identifier for a cell managed by a DU, and the first global identifier is a global identifier used by the cell after the DU migrates to the target CU; and a sending device, configured to send the first global identifier to the DU.

In a possible implementation, the sending, by the sending device, the first global identifier to the DU includes: sending a first interface message to the DU, and the first interface message includes the first global identifier; or sending a second interface message to a source CU, and the source CU sends the first global identifier to the DU through a third interface message, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the configuration apparatus further includes a receiving device, configured to obtain the second global identifier in a following mode: receiving a migration request sent by the source CU, and obtaining the second global identifier from the migration request; or receiving a fourth interface message sent by the DU, and obtaining the second global identifier from the fourth interface message, and the fourth interface message is used to establish a logical interface between the DU and the target CU, and the first interface message is used to confirm the logical interface.

In a possible implementation, after sending the first global identifier to the DU, the sending device is further configured to: send, in a condition that the second global identifier is obtained from the fourth interface message, the corresponding relationship to the source CU, and when executing handover for each user equipment served by the cell, the source CU indicates the first global identifier which is correct according to the second global identifier used by a cell to which the user equipment is currently connected.

One embodiment of the present application provides a cell global identifier configuration apparatus, applied to a DU, and including: a receiving device, configured to receive a first global identifier configured by a target CU for a cell managed by the DU, and the first global identifier is a global identifier used by the cell after the DU migrates to the target CU.

In a possible implementation, the receiving, by the receiving device, the first global identifier configured by the target CU for the cell managed by the DU includes: receiving a first interface message sent by the target CU, and the first interface message carries the first global identifier; or receiving a third interface message sent by a source CU, and the third interface message carries the first global identifier obtained from a second interface message, the second interface message is sent by the target CU to the source CU, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, before receiving the first global identifier configured by the target CU for the cell managed by the DU, the receiving device is further configured to: receive a migration indication sent by the source CU, and the migration indication is used to indicate migration from the source CU to the target CU; and send a fourth interface message to the target CU, and the fourth interface message includes a second global identifier, the fourth interface message is used to establish a logical interface between the DU and the target CU, and the first interface message is used to confirm the logical interface.

In a possible implementation, the configuration apparatus further includes a sending device, configured to: send, after the receiving device receives the first global identifier configured by the target CU for the cell managed by the DU, a corresponding relationship between the first global identifier and a second global identifier to the source CU, and when executing handover for each user equipment served by the cell, the source CU indicates the first global identifier which is correct according to the second global identifier used by a cell to which the user equipment is currently connected, and the second global identifier is a global identifier used by the cell before the DU migrates to the target CU.

In a possible implementation, the configuration apparatus further includes a changing device. The changing device is configured to: change a global identifier in a system information broadcast of the cell to the first global identifier after the DU migrates to the target CU.

One embodiment of the present application provides a cell global identifier configuration apparatus, applied to a source CU, and including: a sending device, configured to send a migration request to a target CU to migrate a DU to the target CU, and the target CU configures a first global identifier for a cell managed by the DU, and the first global identifier is a global identifier used by the cell after the DU migrates to the target CU.

In a possible implementation, the configuration apparatus further includes a receiving device, configured to: receive a second interface message sent by the target CU after the sending device sends the migration request to the target CU to migrate the DU to the target CU; and obtain the first global identifier from the second interface message, and send a third interface message to the DU by carrying the first global identifier in the third interface message.

In a possible implementation, the second interface message includes a corresponding relationship between the first global identifier and a second global identifier, and the second global identifier is a global identifier used by the cell before the DU migrates to the target CU.

In a possible implementation, the configuration apparatus further includes the receiving device, configured to: receive, after the sending device sends the migration request to the target CU to migrate the DU to the target CU, a corresponding relationship between the first global identifier and a second global identifier sent by the DU or the target CU, and the second global identifier is a global identifier used by the cell before the DU migrates to the target CU; and indicate, when executing handover for each user equipment served by the cell, the first global identifier which is correct according to the second global identifier used by a cell to which the user equipment is currently connected.

One embodiment of the present application further provides a cell global identifier configuration apparatus, applied to a target CU, and including: a processor, a memory and a transceiver.

The processor is configured to read a program in the memory and execute a following process:

- configuring a first global identifier for a cell managed by a DU, and the first global identifier is a global identifier used by the cell after the DU migrates to the target CU; and sending the first global identifier to the DU.

In a possible implementation, the processor is configured to: send a first interface message to the DU, and the first interface message includes the first global identifier; or send a second interface message to a source CU, and the source CU sends the first global identifier to the DU through a third interface message, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the processor is further configured to: receive a migration request sent by the source CU, and obtain the second global identifier from the migration request; or receive a fourth interface message sent by the DU, and obtain the second global identifier from the fourth interface message, and the fourth interface message is used to establish a logical interface between the DU and the target CU, and the first interface message is used to confirm the logical interface.

In a possible implementation, the processor is further configured to: send, in a condition that the second global identifier is obtained from the fourth interface message, the corresponding relationship to the source CU, and when executing handover for each user equipment served by the cell, the source CU indicates the first global identifier which is correct according to the second global identifier used by a cell to which the user equipment is currently connected.

One embodiment of the present application further provides a cell global identifier configuration apparatus, applied to a DU, and including: a processor, a memory and a transceiver.

The processor is configured to read a program in the memory and execute a following process: receiving a first global identifier configured by a target CU for a cell managed by the DU, and the first global identifier is a global identifier used by the cell after the DU migrates to the target CU.

In a possible implementation, the processor is configured to: receive a first interface message sent by the target CU, and the first interface message carries the first global identifier; or receive a third interface message sent by a source CU, and the third interface message carries the first global identifier obtained from a second interface message, the second interface message is sent by the target CU to the source CU, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the processor is further configured to: receive a migration indication sent by the source CU, and the migration indication is used to indicate migration from the source CU to the target CU; and send a fourth interface message to the target CU, and the fourth interface message includes a second global identifier, the fourth interface message is used to establish a logical interface between the DU and the target CU, and the first interface message is used to confirm the logical interface.

In a possible implementation, the processor is further configured to: send a corresponding relationship between a first global identifier and the second global identifier to the source CU, and when executing handover for each user equipment served by the cell, the source CU indicates the first global identifier which is correct according to the second global identifier used by a cell to which the user equipment is currently connected, and the second global identifier is a global identifier used by the cell before the DU migrates to the target CU.

In a possible implementation, the processor is further configured to: change a global identifier in a system information broadcast of the cell to the first global identifier after the DU migrates to the target CU.

One embodiment of the present application further provides a cell global identifier configuration apparatus, applied to a source CU, and including: a processor, a memory and a transceiver.

The processor is configured to read a program in the memory and execute a following process: sending a migration request to a target CU to migrate a DU to the target CU, and the target CU configures a first global identifier for a cell managed by the DU, and the first global identifier is a global identifier used by the cell after the DU migrates to the target CU.

In a possible implementation, the processor is further configured to: receive a second interface message sent by the target CU; and obtain the first global identifier from the second interface message, and send a third interface message to the DU by carrying the first global identifier in the third interface message.

In a possible implementation, the second interface message includes a corresponding relationship between the first global identifier and a second global identifier, and the second global identifier is a global identifier used by the cell before the DU migrates to the target CU.

In a possible implementation, the processor is further configured to: receive, after sending the migration request to the target CU to migrate the DU to the target CU, a corresponding relationship between the first global identifier and a second global identifier sent by the DU or the target CU, and the second global identifier is a global identifier used by the cell before the DU migrates to the target CU; and indicate, when executing handover for each user equipment served by the cell, the first global identifier which is correct according to the second global identifier used by a cell to which the user equipment is currently connected.

One embodiment of the present application further provides a readable storage medium, including: a memory, configured to store an instruction, and the instruction, when executed by a processor, causes an apparatus including the readable storage medium to complete the method in the embodiments described above.

Through the above one or more embodiments of the embodiments of the present application, the embodiments of the present application at least have the following effects: in the embodiments provided by the present application, the target CU configures the first global identifier for the DU about to migrate to the target CU and sends the first global identifier to the DU, and the target CU may dynamically allocate the first global identifier to the cell managed by the DU when the DU migrates to the target CU, thus the DU does not need intervention of a network management when migrating between different CUs, and the network management does not need to use a complex signaling process to configure the global identifier for the cell managed by the DU each time the DU migrates, and the global identifier can be configured for the mobile DU quickly and accurately.

DETAILED DESCRIPTION OF THE EMBODIMENTS

Figure 1:
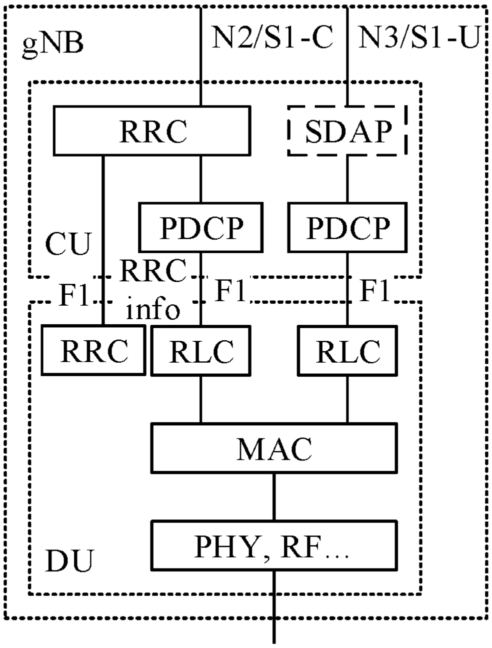
FIG. 1 is a schematic structural diagram of gNB-CU/DU separation.

Embodiments of the present application provide a cell global identifier configuration method and apparatus, and a storage medium, for use in solving the problem present in the prior art that configuration of a global identifier for a mobile DU is complex in operation and error-prone.

In order to solve the above problem, the embodiments of the present application has the following general idea.

A cell global identifier configuration method is provided, and performed by a target CU. The configuration method includes: a first global identifier is configured for a cell managed by a DU, and the first global identifier is a global identifier used by the cell after the DU migrates to the target CU.

Because in the above solutions, the first global identifier is configured for the DU about to migrate through the target CU and sent to the DU, and the target CU may dynamically allocate the first global identifier to the cell managed by the DU when the DU migrates to the target CU, thus the DU does not need intervention of a network management when migrating between different CUs, and the network management does not need to use a complex signaling process to configure the global identifier for the cell managed by the DU each time the DU migrates, and the global identifier can be configured for the mobile DU quickly and accurately.

In order to better understand the above embodiments, the embodiments of the present application will be illustrated in detail below through accompanying drawings and specific embodiments. It should be understood that the embodiments of the present application and specific features in the embodiments are detailed descriptions of the embodiments of the present application, rather than limitation to the embodiments of the present application. The embodiments of the present application and the embodiments can be mutually combined in a case of no conflict.

Before introducing the embodiments of the present application, the knowledge related to the present application are introduced first.

1) Cell Identifier

In a wireless communication network, each wireless communication cell has a globally unique identifier, namely, a cell global identifier (CGI), applicable to a radio access technology (RAT).

Taking the RAT of a new radio (NR) as an example, the CGI of the NR is an NCGI (NR CGI). The NCGI is a bit string with a length of 60 bits, and its highest n bits are strictly equal to (where a value range of n is an integer with 46≤n≤56): (1) a global gNB identifier (Global gNB ID) of a radio access network node (gNB, not an abbreviation, which means the radio access network node belonging to a 5G system and providing a radio access service using an NR technology) to which the cell belongs. or, (2) a global en-gNB identifier (Global en-gNB ID) of a radio access network node (en-gNB, not an abbreviation, which means the radio access network node belonging to an evolved packet system (EPS) and providing the radio access service using the NR technology) to which the cell belongs.

This design is mainly for the convenience of a routing function: as long as a radio access network node knows the NCGI of one cell, it may gradually route to the gNB or en-gNB of the cell according to its several highest bits. The convenience of routing is crucial to many functions, such as handover, air interface interference cancellation, and automatic neighbor cell relationship establishment.

2) gNB-CU/DU Separation

In order to adapt to diversified deployment scenarios, the industry proposes a gNB-CU/DU separation technology. The technology further subdivides one gNB or en-gNB into one CU and one or more DUs. The two are connected by an F1 interface. According to the current technology, one DU can only be connected with one CU at a time.

Please refer to FIG. 1, which is a schematic structural diagram of the gNB-CU/DU separation. Solid lines represent data channels, including bearer and inter-node signaling.

gNB-CU contains a central control function that controls the whole gNB or en-gNB, an air interface radio resource control (RRC) function, an interface RRC function, a service data adaptation protocol (SDAP) function and a packet data convergence protocol (PDCP) function, while gNB-DU contains the interface RRC function, a radio link control (RLC) function, a media access control (MAC) function, a physical (PHY) function, a radio frequency (RF) function and the like. The control for a specific cell belongs to the physical function, and thus belongs to one of the gNB-DU functions.

Under a gNB-CU/DU architecture, the NCGI of the cell controlled by the gNB-DU is directly configured by a network management. In one embodiment, in a network deployment process, before the gNB-DU is invoked, the network management will inform the gNB-DU of which gNB-CU it should be connected to, and the specific configurations for all the cells controlled by it, including specific values of the NCGIs of these cells. After that, the gNB-DU is connected with the gNB-CU indicated by the network management according to the configuration from the network management, establishes the F1 interface, and then informs the gNB-CU of its own configuration information including the NCGI of the managed cells through the F1 interface. When the DU is fixed and deployed on the ground, generally speaking, the NCGI will remain unchanged after that.

Since one gNB or en-gNB can only contain one gNB-CU, the Global gNB ID or Global en-gNB ID is usually and equivalently regarded as the global identifier of the gNB-CU.

However, in actual deployment, there may be a situation where one gNB-DU needs to migrate among multiple gNB-CUs from time to time.

For example, in order to provide the radio access service for devices located in remote areas (or in the ocean) where the population is sparse, gNB-DU may be located on a low earth orbit satellite, which is not stationary relative to the ground. For another example, due to limitations of band penetration and other factors, if terminals on large vehicles such as a train and an aircraft are directly connected with traditional mobile communication base stations fixed on the ground, spectrum utilization efficiency is often low, which is not conducive to broadband transmission. In this case, if the gNB-DU is deployed in these large vehicles, quality of service can be significantly improved. Correspondingly, the gNB-CU is similar to an existing ground system, and is deployed in a location, such as a computer room, fixed on the ground.

Because such gNB-DU is usually in motion, it is difficult to ensure that one gNB-DU can always be connected with only one gNB-CU in actual operation. This means that the gNB-DU needs to migrate between different gNB-CUs, that is, to disconnect from the old gNB-CU and be connected with the new gNB-CU. Since the high bit(s) of the CGI is strictly equal to the Global gNB ID or Global en-gNB ID, the CGI also needs to change during migration of the gNB-DU. If the network management needs to be involved in gNB-DU migration each time, the signaling process will be very complex and inefficient, and will be prone to leading to errors.

It should be noted that when the DU is mobile, a communication interface between the DU and the CU is also called the F1 interface. The F1 interface may be established through wired transmission, such as a network cable and an optical fiber, or through wireless transmission, such as an RRC connection between specific UE of the DU and the target CU, a laser link between the DU and the target CU, or a microwave link between the DU and the target CU. The specific UE of the DU is the UE with the RRC connection with the target CU, such as a mobile terminal (MT) in an integrated access and backhaul (IAB) network.

For example, one specific UE is connected to the mobile DU (the mobile DU and the specific UE are deployed together, for example, on the same physical device, or deployed nearby through wired connection). Each CU is connected with one specific DU (the CU and the specific DU may be deployed together, for example, on the same physical device, or on two different physical devices, through wired connection and adjacent deployment).

The specific UE may reside on the specific DU connected with the CU to measure and report a signal of a mobile DU; and the RRC connection between the UE and the CU may serve as bearer of the F1 interface between the mobile DU and the CU.

In a moving scenario of the DU, the specific UE with the DU may be switched to the target CU first, and then the RRC connection between the specific UE and the target CU carries the F1 establishment and subsequent F1 signaling between the DU and the target CU.

For another example, when the mobile DU is deployed on the train, the mobile DU uses the F1 interface to transmit information, and when the train arrives at a station, performs information transmission by using the F1 interface carried by a wired network of the station and switches to the target CU.

In order to solve the above problem, the present application adopts the following solutions.

Figure 2:
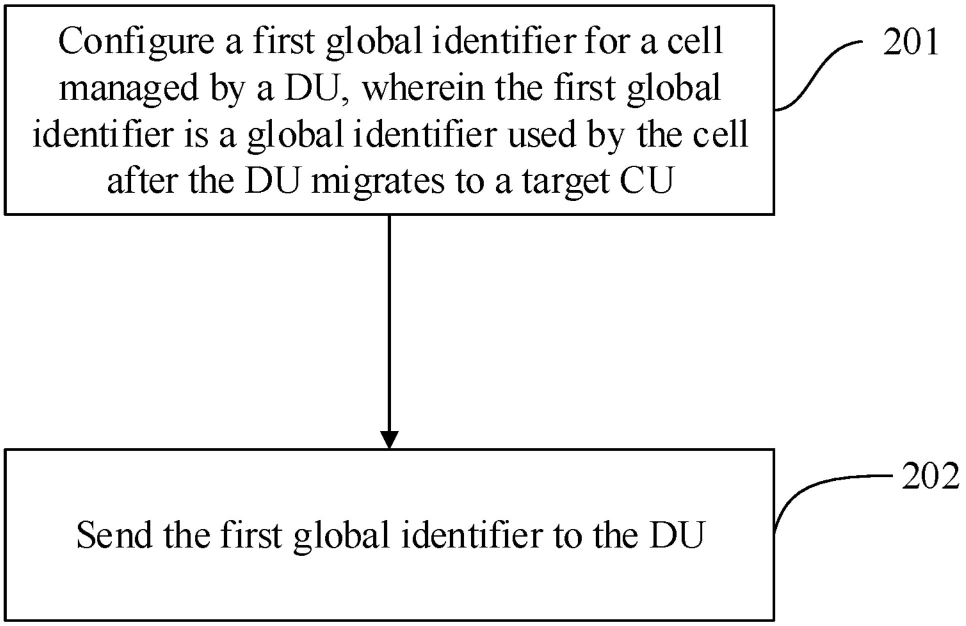
FIG. 2 is a flow diagram of a cell global identifier configuration method on a target CU side provided by an embodiment of the present application.

Please refer to FIG. 2, an embodiment of the present application provides a cell global identifier configuration method, performed by a target CU. Processing processes of the configuration method are as follows.

Step 201: a first global identifier is configured for a cell managed by a DU, and the first global identifier is a global identifier used by the cell after the DU migrates to the target CU.

Step 202: the first global identifier is sent to the DU.

Before the DU migrates to the target CU, assuming that the DU is connected with a source CU (it means that both a channel of a transport layer and a protocol layer are connected), the source CU decides to migrate the DU to the target CU at a certain moment, and thus the source CU sends a migration request to the target CU. After receiving the migration request sent by the source CU, the target CU decides to accept the migration request, and then configures the first global identifier for the cell managed by the DU and sends it to the DU, and the cell managed by the DU can use the first global identifier after the DU migrates to the target CU.

The target CU sends the first global identifier to the DU, either the target CU directly sends the first global identifier to the DU, or the target CU indirectly sends the first global identifier to the DU via the source CU.

If the connection is established between the target CU and the DU (it means that the channel of the transport layer is established), the target CU may directly send the first global identifier to the DU. The target CU sends a first interface message to the DU, and the first interface message includes the first global identifier.

The first interface message further includes a corresponding relationship between the first global identifier and a second global identifier, and the second global identifier is a global identifier used by the cell before the DU migrates to the target CU.

Figure 3:
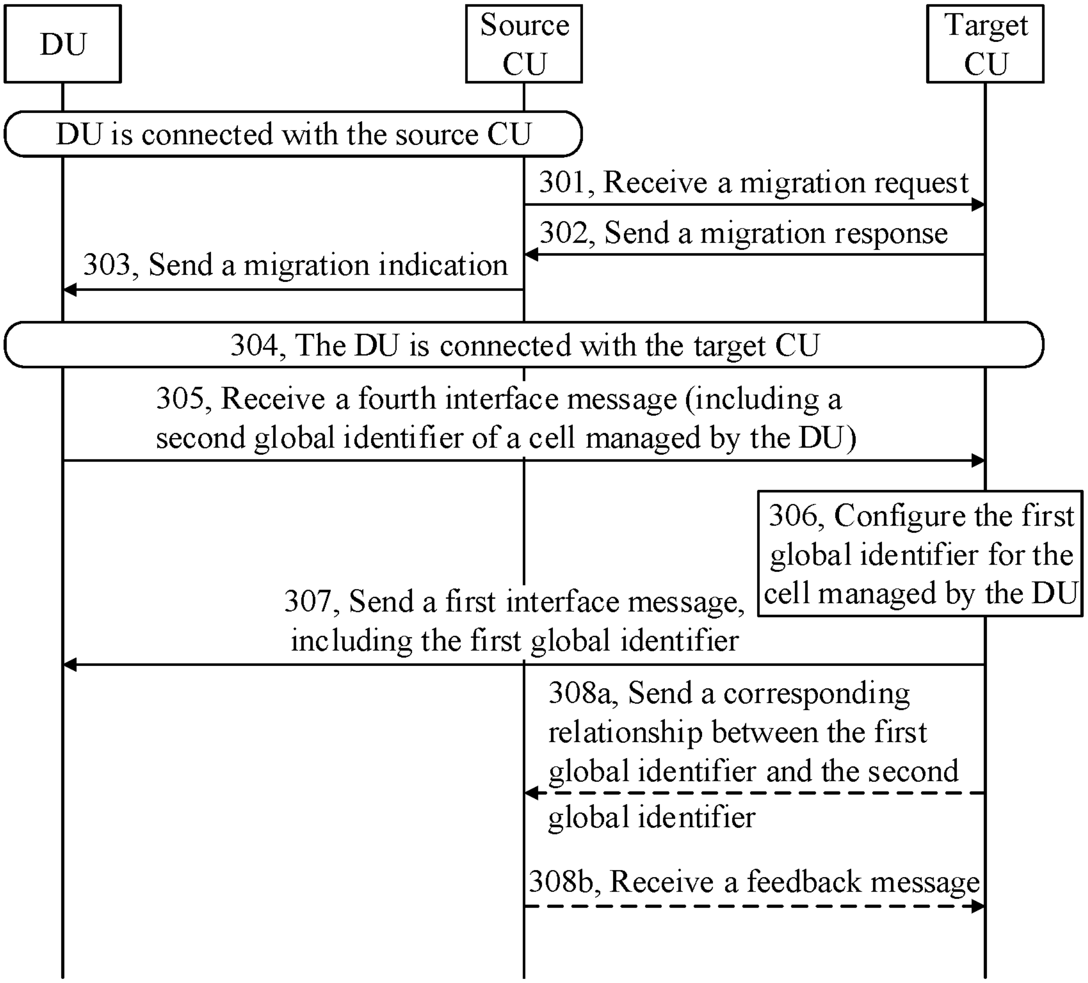
FIG. 3 is a first flow diagram of migration triggered by a source CU through F1 provided by an embodiment of the present application.

Please refer to FIG. 3, which is a first flow diagram of migration triggered by the source CU through F1 provided by an embodiment of the present application.

Step 301: the target CU receives the migration request sent by the source CU, and the migration request is used to request to migrate the DU to the target CU.

Step 302: the target CU sends a migration response to the source CU, and the migration response is used to determine to accept the migration of the DU.

Step 303: the source CU sends a migration indication to the DU, for indicating the DU to migrate to the target CU.

Step 304: the target CU is connected with the DU.

At the same time, the source CU releases the second global identifier occupied by the DU.

Then, the DU changes the second global identifier in a system information broadcast of the cell managed by the DU to the first global identifier.

Step 305: the target CU receives a fourth interface message sent by the DU, and the fourth interface message includes the second global identifier of the cell managed by the DU.

The second global identifier is a global identifier used by the cell managed by the DU when the DU is connected with the source CU. The fourth interface message is used to establish an F1 logical interface between the DU and the target CU.

Step 306: the target CU configures the first global identifier for the cell managed by the DU.

The first global identifier is a global identifier used by the cell managed by the DU when the DU is connected with the target CU.

Step 307: the target CU sends the first interface message to the DU, and the first interface message includes the first global identifier.

The first interface message is used to confirm the F1 logical interface.

The first interface message may include the corresponding relationship between the first global identifier and the second global identifier.

Step 308*a*: the target CU sends the corresponding relationship between the first global identifier and the second global identifier to the source CU.

According to the corresponding relationship between the first global identifier and the second global identifier, the source CU may indicate, when executing handover for each user equipment served by each cell managed by the DU, the first global identifier which is correct according to the second global identifier used by a cell to which the user equipment is currently connected.

Step 308*b*: the target CU receives a feedback message sent by the source CU.

The feedback message is used to indicate the reception of the above corresponding relationship.

Finally, the DU is disconnected from the source CU.

It should be noted that the corresponding relationship between the first global identifier and the second global identifier may also be sent by the DU to the source CU. At this moment, steps 308*a*-308*b* above do not need to be executed.

If there is no connection established between the target CU and the DU, the target CU may indirectly send the first global identifier to the DU through the source CU in the following two modes.

The target CU forwards the first interface message to the DU through the source CU.

Or, the target CU sends a second interface message to the source CU, and the source CU sends the first global identifier to the DU through a third interface message, and the second interface message includes the first global identifier.

The process of the target CU indirectly sending the first global identifier to the DU through the source CU is illustrated below through some specific examples.

Figure 4:
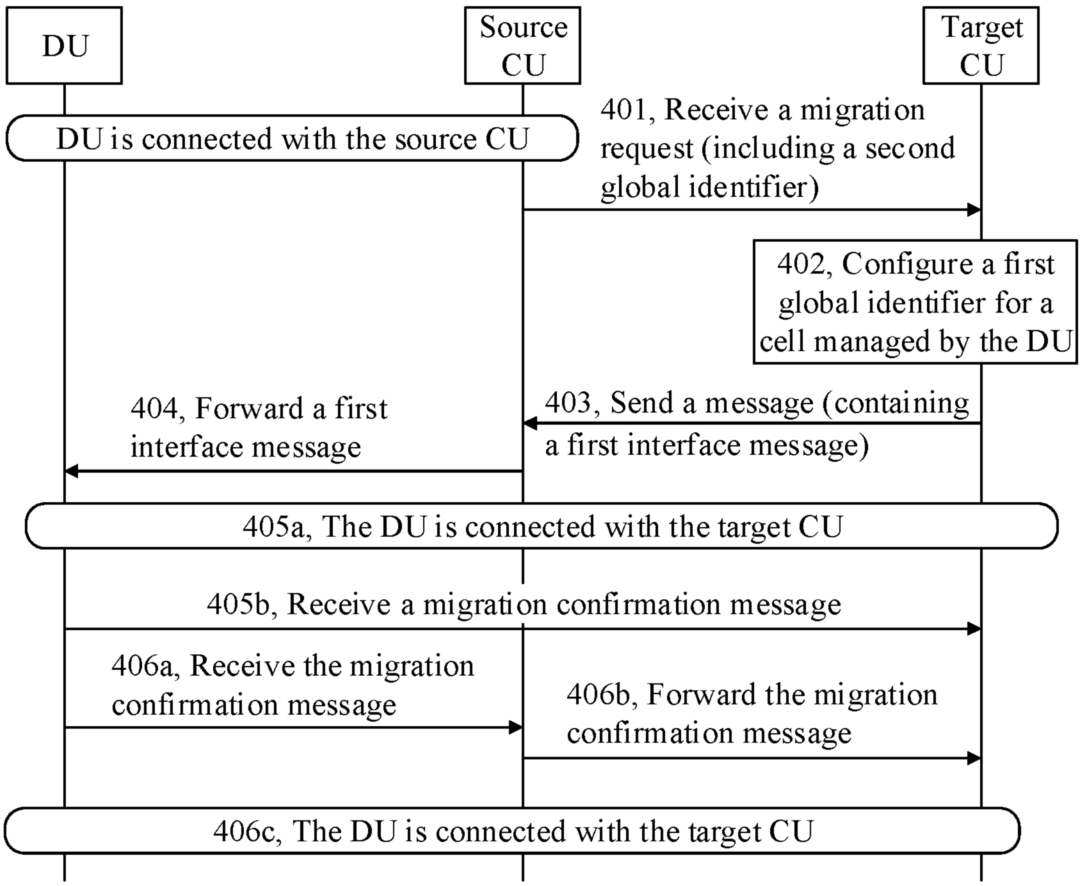
FIG. 4 is a first flow diagram of migration triggered by a source CU through Xn provided by an embodiment of the present application.

Please refer to FIG. 4, which is a first flow diagram of migration triggered by the source CU through Xn provided by an embodiment of the present application.

Step 401: the target CU receives the migration request sent by the source CU, and the migration request includes the second global identifier.

The migration request is used to request to migrate the DU from the source CU to the target CU.

Step 402: the target CU configures the first global identifier for the cell managed by the DU.

The target CU may transparently transmit the first global identifier to the DU, which is realized through step 403 and step 404.

Step 403: the target CU sends a message to the source CU, containing the first interface message, and the first interface message includes the first global identifier.

The first interface message may further include the corresponding relationship between the first global identifier and the second global identifier.

The first interface message may further be used to indicate to accept the migration request.

Step 404: the source CU forwards the first interface message to the DU.

The first interface message may further be used to indicate the DU to migrate to the target CU.

Then, there are two modes to establish the connection between the DU and the target CU.

Mode 1

Step 405*a*: the DU is connected with the target CU.

The DU is disconnected from the source CU. Disconnection may be executed before, at the same time that, or after the DU is connected with the target CU.

At the same time, the source CU releases the second global identifier occupied by the DU.

Then, the DU changes the second global identifier in a system information broadcast of the cell managed by the DU to the first global identifier.

Step 405*b*: the target CU receives a migration confirmation message sent by the DU.

In this way, the connection between the DU and the target CU is established.

Mode 2

Step 406*a*: the source CU receives the migration confirmation message sent by the DU.

Step 406*b*: the source CU forwards the migration confirmation message to the target CU.

Step 406*c*: the DU is connected with the target CU.

When appropriate, the DU and the CU establish a connection.

The DU is disconnected from the source CU. Disconnection may be executed before, at the same time that, or after the DU is connected with the target CU.

At the same time, the source CU releases the second global identifier occupied by the DU.

Then, the DU changes the second global identifier in the system information broadcast of the cell managed by the DU to the first global identifier.

In this way, the connection between the DU and the target CU is established.

Figure 5:
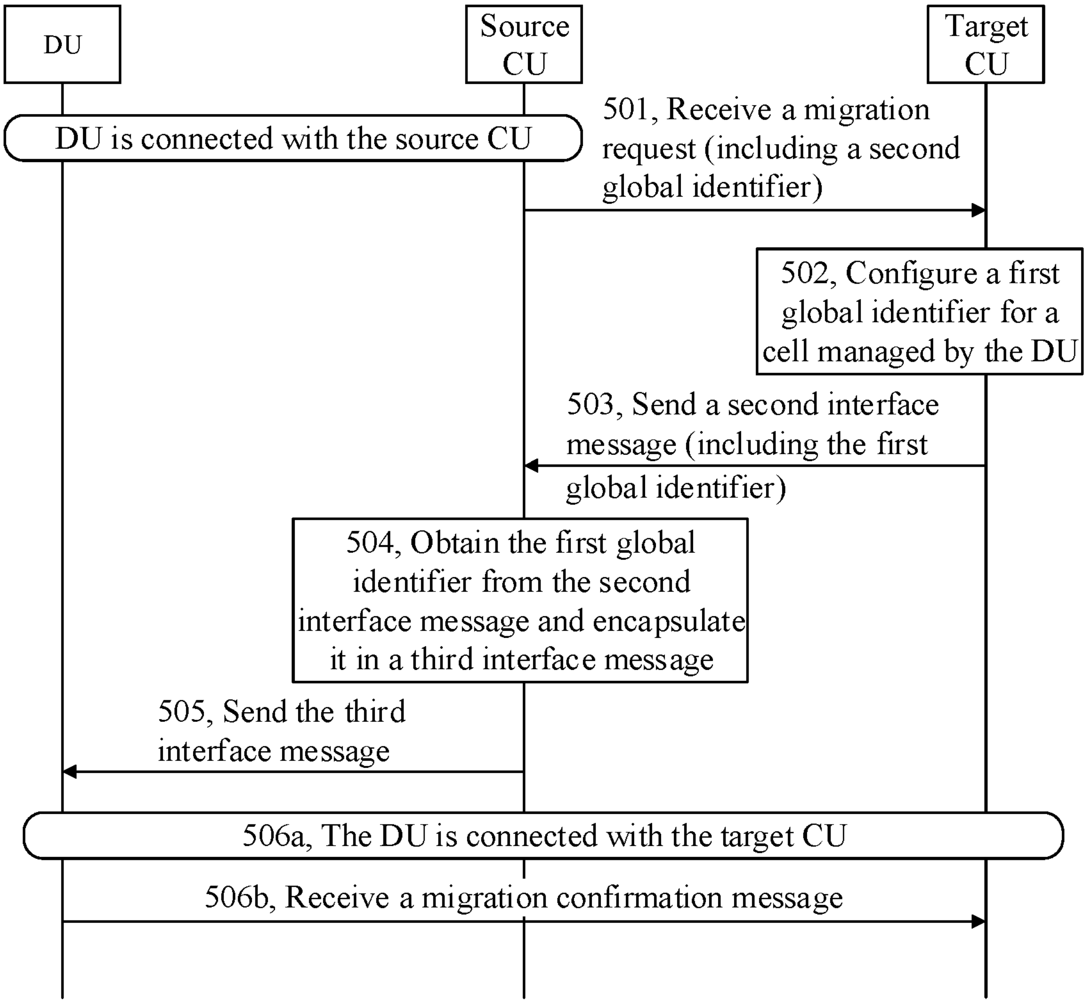
FIG. 5 is a second flow diagram of migration triggered by a source CU through Xn provided by an embodiment of the present application.

Please refer to FIG. 5, which is a second flow diagram of migration triggered by the source CU through Xn provided by an embodiment of the present application.

Step 501: the target CU receives the migration request sent by the source CU, and the migration request includes the second global identifier.

The migration request is used to request to migrate the DU from the source CU to the target CU.

Step 502: the target CU configures the first global identifier for the cell managed by the DU.

Step 503: the target CU sends the second interface message to the source CU, and the second interface message includes the first global identifier.

The second interface message may further include the corresponding relationship between the first global identifier and the second global identifier.

The second interface message may further be used to indicate to accept the migration request.

Step 504: the source CU obtains the first global identifier from the second interface message and encapsulates the first global identifier in the third interface message.

If the second interface message further includes the corresponding relationship between the first global identifier and the second global identifier, the third interface message also includes the corresponding relationship between the first global identifier and the second global identifier.

The second interface message may further be used to indicate the DU to migrate to the target CU.

Step 505: the source CU forwards the third interface message to the DU.

Step 506*a*: the DU is connected with the target CU.

The DU is disconnected from the source CU. Disconnection may be executed before, at the same time that, or after the DU is connected with the target CU.

At the same time, the source CU releases the second global identifier occupied by the DU.

Then, the DU changes the second global identifier in the system information broadcast of the cell managed by the DU to the first global identifier.

Step 506*b*: the target CU receives the migration confirmation message sent by the DU.

Figure 6:
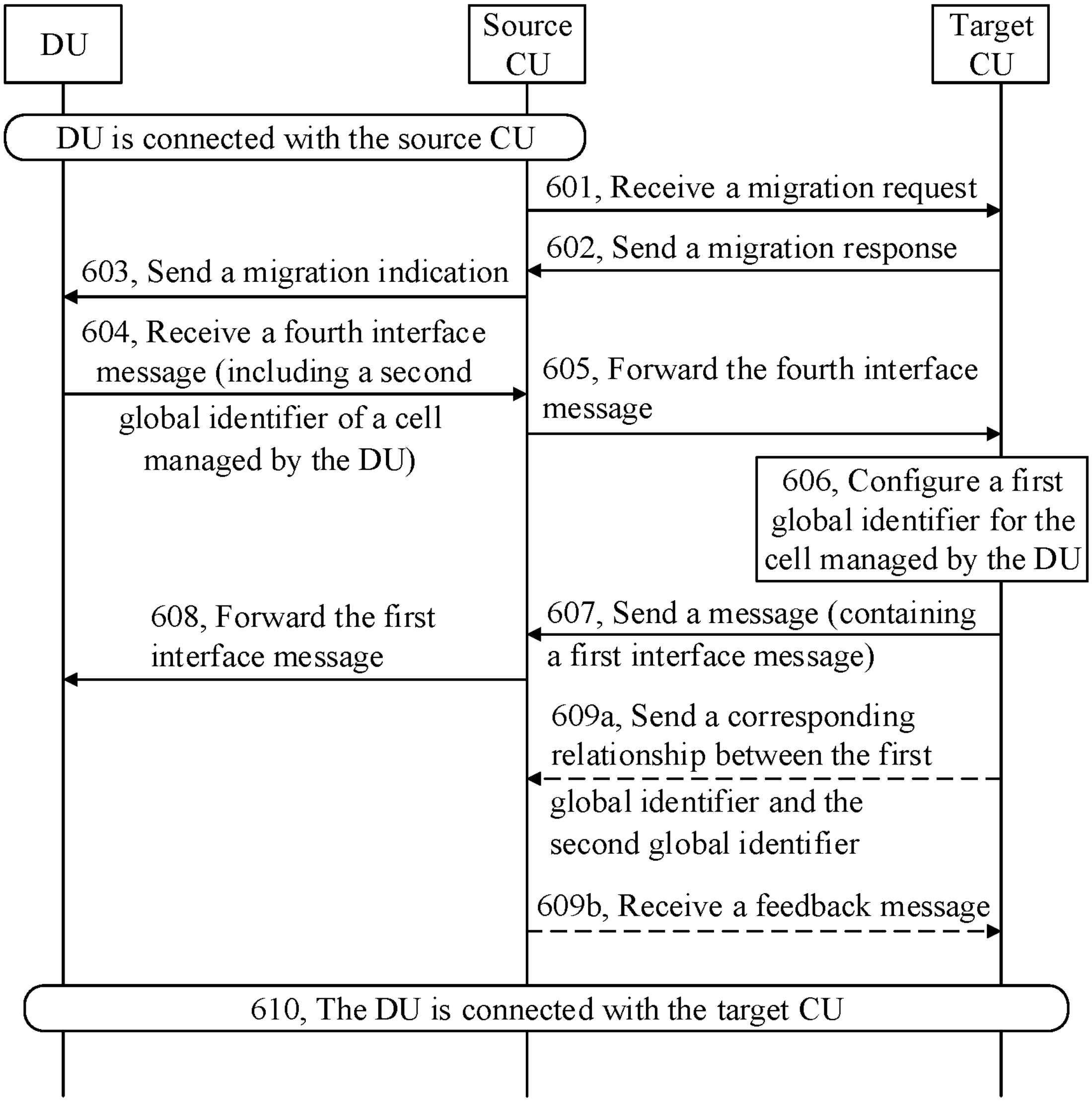
FIG. 6 is a second flow diagram of migration triggered by a source CU through F1 provided by an embodiment of the present application.

Please refer to FIG. 6, which is a second flow diagram of migration triggered by the source CU through F1 provided by an embodiment of the present application.

Step 601: the target CU receives the migration request sent by the source CU, and the migration request is used to request to migrate the DU to the target CU.

Step 602: the target CU sends the migration response to the source CU, and the migration response is used to determine to accept the migration of the DU.

Step 603: the source CU sends the migration indication to the DU, for indicating the DU to migrate to the target CU.

Step 604: the source CU receives the fourth interface message sent by the DU, and the fourth interface message includes the second global identifier of the cell managed by the DU.

The fourth interface message is used to establish the F1 logical interface between the DU and the target CU.

Step 605: the source CU forwards the fourth interface message to the target CU.

Step 606: the target CU configures the first global identifier for the cell managed by the DU.

The first global identifier is the global identifier used by the cell managed by the DU when the DU is connected with the target CU.

The target CU may transparently transmit the first global identifier to the DU, which is realized through step 607 and step 608.

Step 607: the target CU sends a message to the source CU, containing the first interface message, and the first interface message includes the first global identifier.

The first interface message may further include the corresponding relationship between the first global identifier and the second global identifier.

The first interface message is used to confirm to establish the F1 logical interface between the DU and the target CU.

Step 608: the source CU forwards the first interface message to the DU.

The target CU may send the corresponding relationship between the first global identifier and the second global identifier to the source CU, which specifically adopts step 609*a* and step 609*b*.

Step 609*a*: the target CU sends the corresponding relationship between the first global identifier and the second global identifier to the source CU.

According to the corresponding relationship between the first global identifier and the second global identifier, the source CU may indicate, when executing handover for each user equipment served by each cell managed by the DU, the first global identifier which is correct according to the second global identifier used by the cell to which the user equipment is currently connected.

Step 609*b*: the target CU receives a feedback message sent by the source CU.

The feedback message may be used to indicate completion of handover of the user equipment, or the reception of the above corresponding relationship.

It should be noted that the corresponding relationship between the first global identifier and the second global identifier may also be sent by the DU to the source CU. At this moment, the steps 609*a* and 609*b* above need not be executed.

Step 610: the DU is connected with the target CU.

The DU is disconnected from the source CU. Disconnection may be executed before, at the same time that, or after the DU is connected with the target CU.

At the same time, the source CU releases the second global identifier occupied by the DU.

Then, the DU changes the second global identifier in the system information broadcast of the cell managed by the DU to the first global identifier.

It can be known from the embodiments provided in FIG. 3 to FIG. 6 that the target CU may obtain the second global identifier in the following two modes.

Mode 1: the target CU receives the migration request from the source CU, and obtains the second global identifier from the migration request, and the migration request includes the second global identifier.

Mode 2: the target CU receives the fourth interface message from the DU, and obtains the second global identifier from the fourth interface message, and the fourth interface message includes the second global identifier, the fourth interface message is used to establish the F1 logical interface between the DU and the target CU, and the first interface message is used to confirm the F1 logical interface.

It may further be known from the embodiments provided in FIG. 3 to FIG. 6 that: in a condition that the second global identifier is obtained from the fourth interface message, the target CU may send the corresponding relationship between the first global identifier and the second global identifier to the source CU, and when executing handover for each user equipment served by the cell, the source CU indicates the first global identifier which is correct according to the second global identifier used by the cell to which the user equipment is currently connected.

After introducing the improvements made in configuring the first global identifier of the cell managed by the DU from the target CU side, the improvements made on the DU side will be introduced from the DU side as follows.

Embodiments of the present application provide a cell global identifier configuration method, performed by a DU. The configuration method includes: a first global identifier configured by a target CU for a cell managed by the DU is received, and the first global identifier is a global identifier used by the cell after the DU migrates to the target CU.

In the embodiment provided by the present application, the first global identifier configured by the target CU for the cell managed by the DU may be received directly from the target CU or indirectly through a source CU.

Receiving directly from the target CU may be: receiving a first interface message sent by the target CU, and the first interface message carries the first global identifier.

In the embodiment provided by the present application, the first interface message further includes a corresponding relationship between the first global identifier and a second global identifier, and the second global identifier is a global identifier used by the cell before the DU migrates to the target CU.

Figure 7:
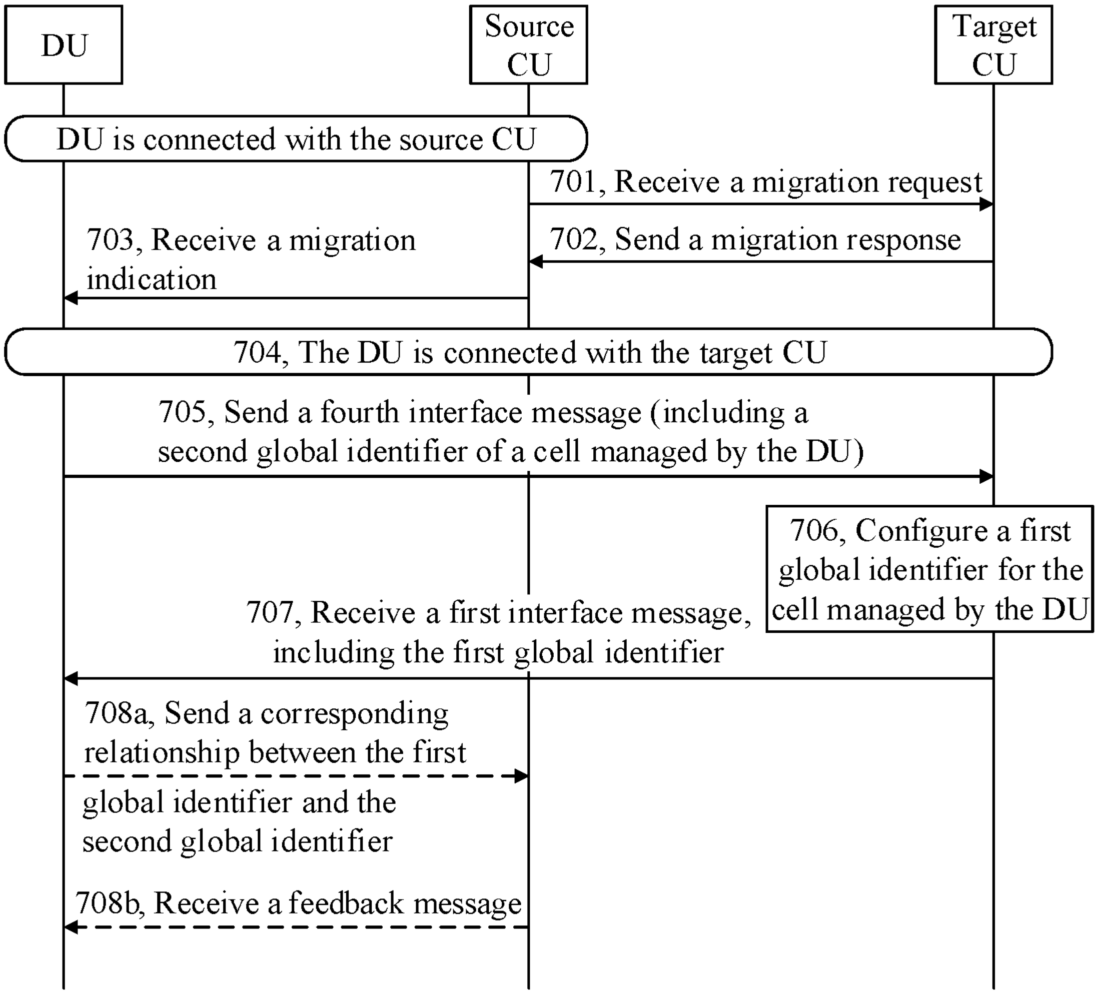
FIG. 7 is a third flow diagram of migration triggered by a source CU through F1 provided by an embodiment of the present application.

Please refer to FIG. 7, which is a third flow diagram of migration triggered by the source CU through F1 provided by an embodiment of the present application.

Step 701: the target CU receives a migration request sent by the source CU, and the migration request is used to request to migrate the DU to the target CU.

Step 702: the target CU sends a migration response to the source CU, and the migration response is used to determine to accept the migration of the DU.

Step 703: the DU receives a migration indication sent by the source CU, and the migration indication is used to indicate the DU to migrate to the target CU.

Step 704: the target CU is connected with the DU.

At the same time, the source CU releases the second global identifier occupied by the DU.

Then, the DU changes the second global identifier in a system information broadcast of the cell managed by the DU to the first global identifier.

Step 705: the DU sends a fourth interface message to the target CU, and the fourth interface message includes the second global identifier of the cell managed by the DU.

The second global identifier is a global identifier used by the cell managed by the DU when the DU is connected with the source CU. The fourth interface message is used to establish an F1 logical interface between the DU and the target CU.

Step 706: the target CU configures the first global identifier for the cell managed by the DU.

The first global identifier is the global identifier used by the cell managed by the DU when the DU is connected with the target CU.

Step 707: the DU receives the first interface message sent by the target CU, and the first interface message includes the first global identifier.

The first interface message is used to confirm the F1 logical interface.

The first interface message may include the corresponding relationship between the first global identifier and the second global identifier.

Step 708*a*: the DU sends the corresponding relationship between the first global identifier and the second global identifier to the source CU.

According to the corresponding relationship between the first global identifier and the second global identifier, the source CU may indicate, when executing handover for each user equipment, the first global identifier which is correct according to the second global identifier used by a cell to which the user equipment is currently connected.

Step 708*b*: the DU receives a feedback message sent by the source CU.

The feedback message may be used to indicate completion of handover of the user equipment, or the reception of the above corresponding relationship.

Finally, the DU is disconnected from the source CU.

It should be noted that the corresponding relationship between the first global identifier and the second global identifier may also be sent by the target CU to the source CU. At this moment, steps 708*a* and 708*b* above do not need to be executed.

Receiving indirectly the corresponding relationship between the first global identifier and the second global identifier through the source CU may be: the first interface message forwarded by the source CU is received, and the specific implementation may refer to the embodiment in FIG. 4.

Or, a third interface message sent by the source CU is received, and the third interface message carries the first global identifier obtained from a second interface message, the second interface message is sent by the target CU to the source CU, and the second interface message includes the first global identifier. The specific implementation may refer to the embodiment in FIG. 5.

Figure 8:
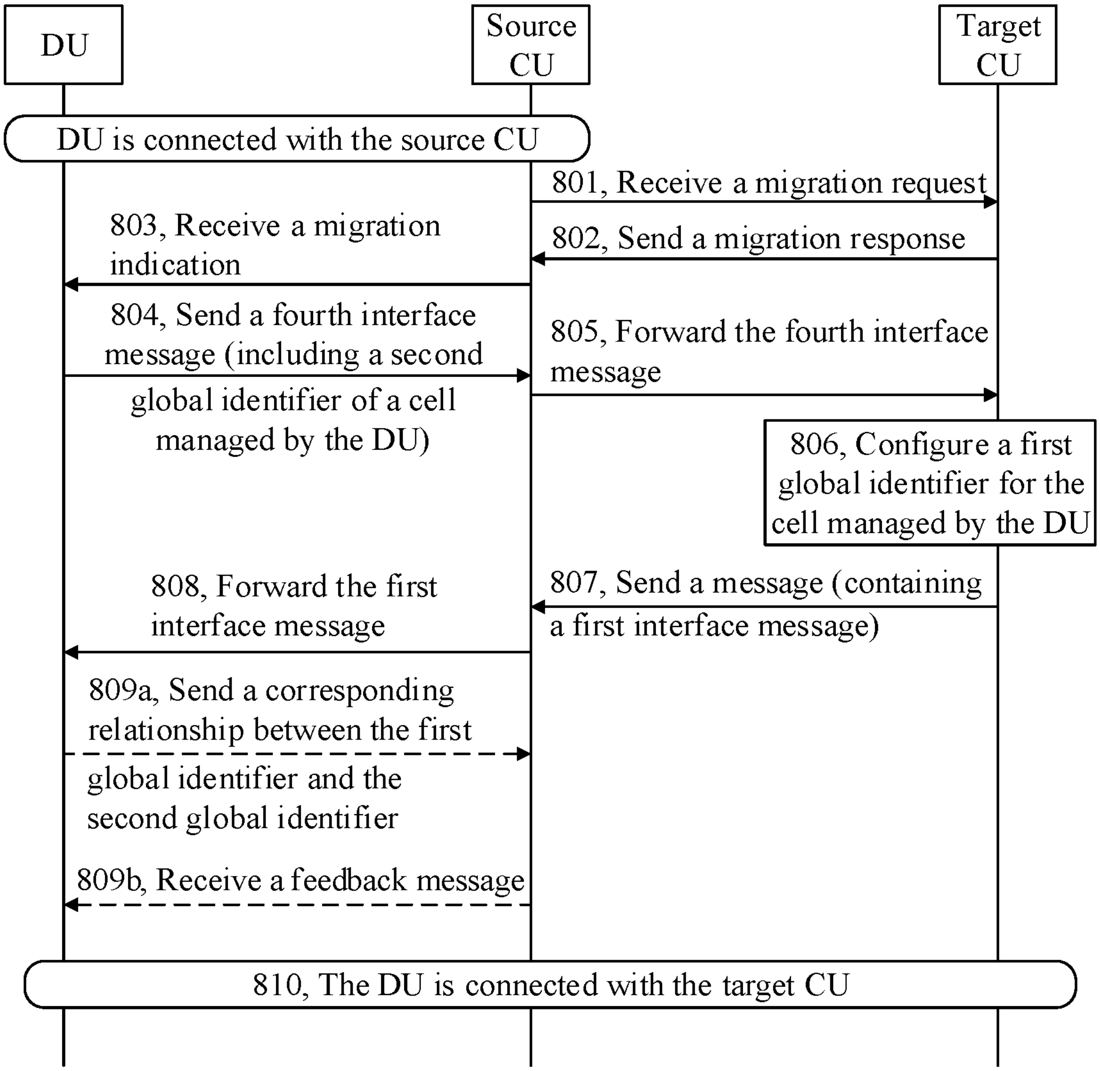
FIG. 8 is a fourth flow diagram of migration triggered by a source CU through F1 provided by an embodiment of the present application.

Please refer to FIG. 8, which is a fourth flow diagram of migration triggered by the source CU through F1 provided by an embodiment of the present application.

Step 801: the target CU receives the migration request sent by the source CU, and the migration request is used to request to migrate the DU to the target CU.

Step 802: the target CU sends the migration response to the source CU, and the migration response is used to determine to accept the migration of the DU.

Step 803: the DU receives the migration indication sent by the source CU, and the migration indication is used to indicate the DU to migrate to the target CU.

Step 804: the DU sends the fourth interface message to the target CU, and the fourth interface message includes the second global identifier of the cell managed by the DU.

The fourth interface message is used to establish the F1 logical interface between the DU and the target CU.

Step 805: the source CU forwards the fourth interface message to the target CU.

Step 806: the target CU configures the first global identifier for the cell managed by the DU.

The first global identifier is the global identifier used by the cell managed by the DU when the DU is connected with the target CU.

The target CU may transparently transmit the first global identifier to the DU, which is realized through step 807 and step 808.

Step 807: the target CU sends a message to the source CU, including the first interface message, and the first interface message includes the first global identifier.

The first interface message may further include the corresponding relationship between the first global identifier and the second global identifier.

The first interface message is used to confirm to establish the F1 logical interface between the DU and the target CU.

Step 808: the source CU forwards the first interface message to the DU.

The DU may send the corresponding relationship between the first global identifier and the second global identifier to the source CU, which specifically adopts step 809*a* and step 809*b*.

Step 809*a*: the DU sends the corresponding relationship between the first global identifier and the second global identifier to the source CU.

According to the corresponding relationship between the first global identifier and the second global identifier, the source CU may indicate, when executing handover for each user equipment served by each cell managed by the DU, the first global identifier which is correct according to the second global identifier used by the cell to which the user equipment is currently connected.

Step 809*b*: the DU receives a feedback message sent by the source CU.

The feedback message may be used to indicate completion of handover of the user equipment, or the reception of the above corresponding relationship.

It should be noted that the corresponding relationship between the first global identifier and the second global identifier may also be sent by the target CU to the source CU. At this moment, steps 809*a* and 809*b* above do not need to be executed.

Step 810: the DU is connected with the target CU.

The DU is disconnected from the source CU. Disconnection may be executed before, at the same time that, or after the DU is connected with the target CU.

At the same time, the source CU releases the second global identifier occupied by the DU.

Then, the DU changes the second global identifier in the system information broadcast of the cell managed by the DU to the first global identifier.

In the embodiment provided by the present application, before receiving, by the DU, the first global identifier configured by the target CU for the cell managed by the DU, the configuration method further includes the following. The DU receives the migration indication sent by the source CU, and the migration indication is used to indicate migration from the source CU to the target CU; and the DU sends the fourth interface message to the target CU, and the fourth interface message includes the second global identifier, the fourth interface message is used to establish the logical interface between the DU and the target CU, and the first interface message is used to confirm the logical interface.

In the embodiment provided by the present application, the global identifier in the system information broadcast of the cell is changed to the first global identifier after the DU migrates to the target CU.

In the embodiment provided by the present application, the corresponding relationship is sent to the source CU, and the source CU indicates, when executing handover for each user equipment served by the cell, the first global identifier which is correct according to the second global identifier used by a cell to which the user equipment is currently connected.

Embodiments of the present application provide a cell global identifier configuration method, performed by a source CU. For the specific implementation of the method on the source CU side, please refer to the description of the method embodiments on the target CU side or the DU side, and repetitions are omitted here. The configuration method includes: a migration request is sent to a target CU to migrate a DU to the target CU, and the target CU configures a first global identifier for a cell managed by the DU, and the first global identifier is a global identifier used by the cell after the DU migrates to the target CU.

In the embodiment provided by the present application, after sending a migration request to the target CU to migrate the DU to the target CU, the configuration method further includes the following. The first global identifier is obtained from a second interface message, and the first global identifier is carried in a third interface message to be sent to the DU.

In the embodiment provided by the present application, the second interface message includes a corresponding relationship between the first global identifier and a second global identifier, and the second global identifier is a global identifier used by the cell before the DU migrates to the target CU.

In the embodiment provided by the present application, the configuration method further includes: the corresponding relationship sent by the DU or the target CU is received after sending the migration request to the target CU; when executing handover for each user equipment served by the cell, the first global identifier which is correct is indicated according to the second global identifier used by a cell to which the user equipment is currently connected.

Figure 9:
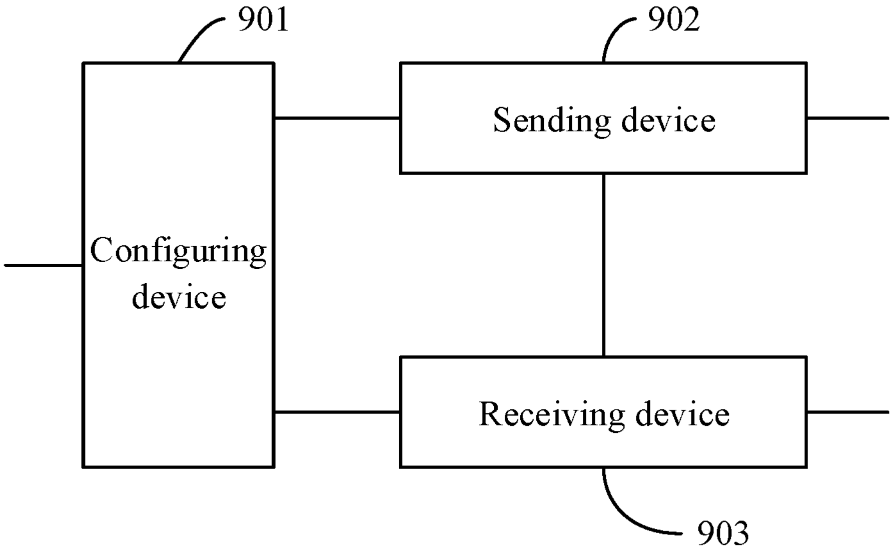
FIG. 9 is a first schematic structural diagram of a cell global identifier configuration apparatus on a target CU side provided by an embodiment of the present application.

Embodiments of the present application provide a cell global identifier configuration apparatus, applied to a target CU. For the specific implementation of the cell global identifier configuration method of the configuration apparatus, please refer to the description of the method embodiments on the target CU side, and repetitions are omitted here. Please refer to FIG. 9, the configuration apparatus includes: a configuring device 901, configured to configure a first global identifier for a cell managed by a DU, and the first global identifier is a global identifier used by the cell after the DU migrates to the target CU; and a sending device 902, configured to send the first global identifier to the DU.

In a possible implementation, the sending, by the sending device 902, the first global identifier to the DU includes: sending a first interface message to the DU, and the first interface message includes the first global identifier; or sending a second interface message to a source CU, and the source CU sends the first global identifier to the DU through a third interface message, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the configuration apparatus further includes a receiving device 903, configured to: receive a migration request sent by the source CU, and obtain the second global identifier from the migration request; or receive a fourth interface message sent by the DU, and obtain the second global identifier from the fourth interface message, and the fourth interface message is used to establish a logical interface between the DU and the target CU, and the first interface message is used to confirm the logical interface.

In a possible implementation, the sending device 902 is further configured to: send, in a condition that the second global identifier is obtained from the fourth interface message, the corresponding relationship to the source CU, and when executing handover for each user equipment served by the cell, the source CU indicates the first global identifier which is correct according to the second global identifier used by a cell to which the user equipment is currently connected.

Figure 10:
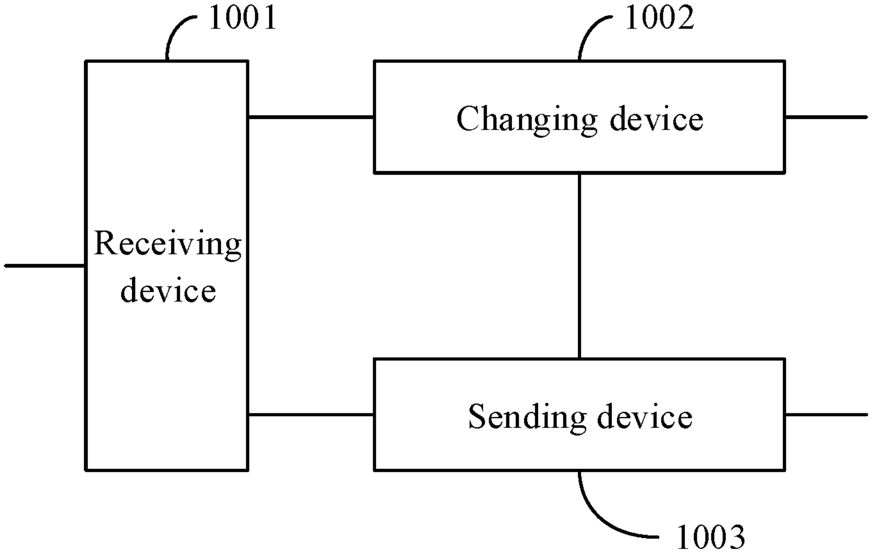
FIG. 10 is a first schematic structural diagram of a cell global identifier configuration apparatus on a DU side provided by an embodiment of the present application.

Embodiments of the present application provide a cell global identifier configuration apparatus, applied to a DU. For the specific implementation of the cell global identifier configuration method of the configuration apparatus, please refer to the description of the method embodiments on the DU side, and repetitions are omitted here. Please refer to FIG. 10, the configuration apparatus includes: a receiving device 1001, configured to receive a first global identifier configured by a target CU for a cell managed by the DU, and the first global identifier is a global identifier used by the cell after the DU migrates to the target CU.

In a possible implementation, the receiving device 1001 is configured to: receive a first interface message sent by the target CU, and the first interface message carries the first global identifier; or receive a third interface message sent by a source CU, and the third interface message carries the first global identifier obtained from a second interface message, the second interface message is sent by the target CU to the source CU, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the receiving device 1001 is further configured to: receive a migration indication sent by the source CU, and the migration indication is used to indicate migration from the source CU to the target CU; and send a fourth interface message to the target CU, and the fourth interface message includes a second global identifier, the fourth interface message is used to establish a logical interface between the DU and the target CU, and the first interface message is used to confirm the logical interface.

In a possible implementation, the configuration apparatus further includes a sending device 1003. The sending device 1003 is configured to: send the corresponding relationship between the first global identifier and the second global identifier to the source CU, and when executing handover for each user equipment served by the cell, the source CU indicates the first global identifier which is correct according to the second global identifier used by a cell to which the user equipment is currently connected, and the second global identifier is a global identifier used by the cell before the DU migrates to the target CU.

In a possible implementation, the configuration apparatus further includes a changing device 1002. The changing device 1002 is configured to: change a global identifier in a system information broadcast of the cell to the first global identifier after the DU migrates to the target CU.

Figure 11:
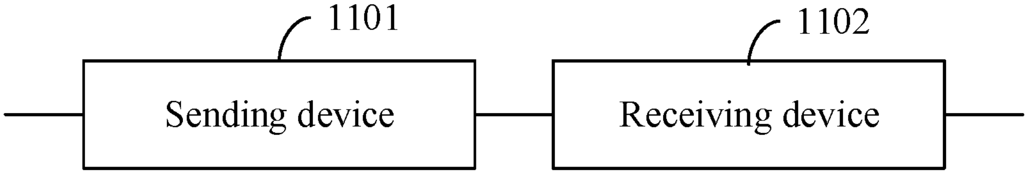
FIG. 11 is a first schematic structural diagram of a cell global identifier configuration apparatus on a source CU side provided by an embodiment of the present application.

Embodiments of the present application provide a cell global identifier configuration apparatus, applied to a source CU. For the specific implementation of the cell global identifier configuration method of the configuration apparatus, please refer to the description of the method embodiments on the source CU side, and repetitions are omitted here. Please refer to FIG. 11, the configuration apparatus includes: a sending device 1101, configured to send a migration request to a target CU to migrate a DU to the target CU, and the target CU configures a first global identifier for a cell managed by the DU, and the first global identifier is a global identifier used by the cell after the DU migrates to the target CU.

In a possible implementation, the configuration apparatus further includes a receiving device 1102, configured to: receive a second interface message sent by the target CU after the sending device sends the migration request to the target CU to migrate the DU to the target CU; and obtain the first global identifier from the second interface message, and carry the first global identifier in a third interface message to be sent to the DU.

In a possible implementation, the second interface message includes a corresponding relationship between the first global identifier and a second global identifier, and the second global identifier is a global identifier used by the cell before the DU migrates to the target CU.

In a possible implementation, the receiving device 1102 is configured to: receive, after the sending device sends the migration request to the target CU to migrate the DU to the target CU, a corresponding relationship between the first global identifier and a second global identifier sent by the DU or the target CU, and the second global identifier is a global identifier used by the cell before the DU migrates to the target CU; and indicate, when executing handover for each user equipment served by the cell, the first global identifier which is correct according to the second global identifier used by a cell to which the user equipment is currently connected.

Figure 12:
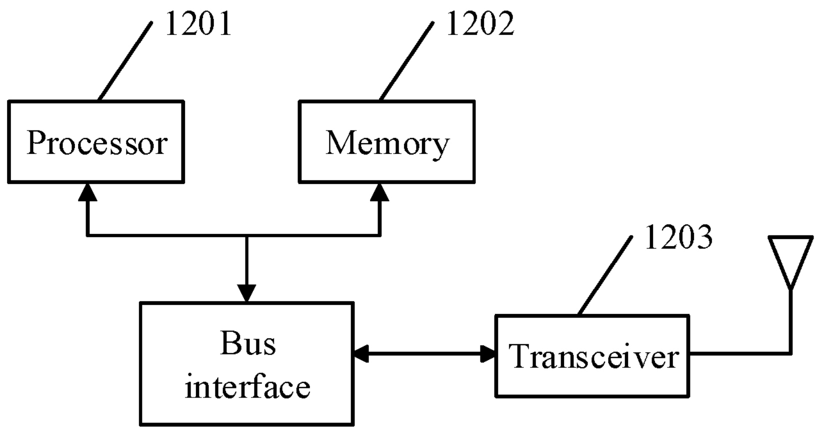
FIG. 12 is a second schematic structural diagram of a cell global identifier configuration apparatus on a target CU side provided by an embodiment of the present application.

As shown in FIG. 12, a cell global identifier configuration apparatus provided by an embodiment of the present application is applied to a target CU, and includes: a processor 1201, a memory 1202 and a transceiver 1203.

The processor 1201 is configured to read a program in the memory 1202 and execute the following: configuring a first global identifier for a cell managed by a DU, and the first global identifier is a global identifier used by the cell after the DU migrates to the target CU; and sending the first global identifier to the DU.

In a possible implementation, the processor 1201 is configured to: send a first interface message to the DU, and the first interface message includes the first global identifier; or send a second interface message to a source CU, and the source CU sends the first global identifier to the DU through a third interface message, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the processor 1201 is further configured to: receive a migration request sent by the source CU, and obtain the second global identifier from the migration request; or receive a fourth interface message sent by the DU, and obtain the second global identifier from the fourth interface message, and the fourth interface message is used to establish a logical interface between the DU and the target CU, and the first interface message is used to confirm the logical interface.

In a possible implementation, the processor 1201 is further configured to: send, in a condition that the second global identifier is obtained from the fourth interface message, the corresponding relationship to the source CU, and when executing handover for each user equipment served by the cell, the source CU indicates the first global identifier which is correct according to the second global identifier used by a cell to which the user equipment is currently connected.

The processor 1201 is responsible for managing a bus architecture and usual processing, and the memory 1202 may store data used by the processor 1201 during operation execution. The transceiver 1203 is configured to receive and send data under control of the processor 1201.

The bus architecture may include any quantity of interconnected buses and bridges, which are specifically linked together by various circuits of one or more processors represented by the processor 1201 and a memory represented by the memory 1202. The bus architecture may further link various other circuits such as a peripheral device, a voltage stabilizer and a power management circuit together, which are publicly known in the art and therefore are not further described herein. A bus interface provides an interface. The processor 1201 is responsible for managing the bus architecture and usual processing, and the memory 1202 may store data used by the processor 1201 during operation execution.

A flow disclosed in the embodiment of the present application may be applied to the processor 1201 or be implemented by the processor 1201. In an implementation process, all steps of a signal processing flow may be completed through an integrated logic circuit of hardware in the processor 1201 or in a software form. The processor 1201 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiment of the present application. The general-purpose processor may be a microprocessor or any conventional processor, etc. The steps of the method disclosed in combination with the embodiment of the present application may be directly embodied as being executed and completed by a hardware processor, or be executed and completed by a hardware and software module combination in the processor 1201. A software module may be located in a random access memory, a flash memory, a read only memory, a programmable read only memory, or an electrically erasable programmable memory, a register and other mature storage mediums in the art. The storage medium is located in the memory 1202, and the processor 1201 reads information in the memory 1202, and is combined with its hardware to complete the steps of the signal processing flow.

Figure 13:
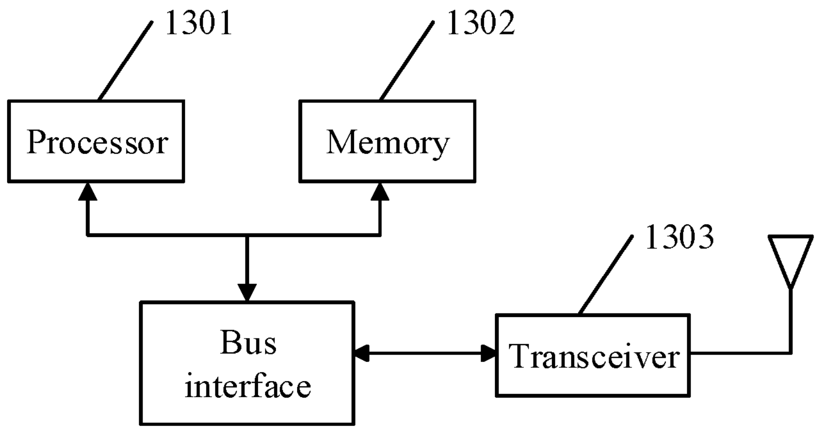
FIG. 13 is a second schematic structural diagram of a cell global identifier configuration apparatus on a DU side provided by an embodiment of the present application.

As shown in FIG. 13, a cell global identifier configuration apparatus provided by an embodiment of the present application is applied to a DU, and includes: a processor 1301, a memory 1302 and a transceiver 1303.

The processor 1301 is configured to read a program in the memory 1302 and execute the following: receiving a first global identifier configured by a target CU for a cell managed by the DU, and the first global identifier is a global identifier used by the cell after the DU migrates to the target CU.

In a possible implementation, the processor 1301 is configured to: receive a first interface message sent by the target CU, and the first interface message carries the first global identifier; or receive a third interface message sent by a source CU, and the third interface message carries the first global identifier obtained from a second interface message, the second interface message is sent by the target CU to the source CU, and the second interface message includes the first global identifier.

In a possible implementation, the first interface message further includes a corresponding relationship between the first global identifier and a second global identifier, and the second global identifier is a global identifier used by the cell before the DU migrates to the target CU.

In a possible implementation, the processor 1301 is further configured to: receive a migration indication sent by the source CU, and the migration indication is used to indicate migration from the source CU to the target CU; and send a fourth interface message to the target CU, and the fourth interface message includes a second global identifier, the fourth interface message is used to establish a logical interface between the DU and the target CU, and the first interface message is used to confirm the logical interface.

In a possible implementation, the processor 1301 is further configured to: send the corresponding relationship between the first global identifier and the second global identifier to the source CU, and when executing handover for each user equipment served by the cell, the source CU indicates the first global identifier which is correct according to the second global identifier used by a cell to which the user equipment is currently connected, and the second global identifier is a global identifier used by the cell before the DU migrates to the target CU.

In a possible implementation, the processor 1301 is further configured to: change a global identifier in a system information broadcast of the cell to the first global identifier after the DU migrates to the target CU.

The processor 1301 is responsible for managing a bus architecture and usual processing, and the memory 1302 may store data used by the processor 1301 during operation execution. The transceiver 1303 is configured to receive and send data under control of the processor 1301.

The bus architecture may include any quantity of interconnected buses and bridges, which are specifically linked together by various circuits of one or more processors represented by the processor 1301 and a memory represented by the memory 1302. The bus architecture may further link various other circuits such as a peripheral device, a voltage stabilizer and a power management circuit together, which are publicly known in the art and therefore are not further described herein. A bus interface provides an interface. The processor 1301 is responsible for managing the bus architecture and usual processing, and the memory 1302 may store data used by the processor 1301 during operation execution.

A flow disclosed in the embodiment of the present application may be applied to the processor 1301 or be implemented by the processor 1301. In an implementation process, all steps of a signal processing flow may be completed through an integrated logic circuit of hardware in the processor 1301 or in a software form. The processor 1301 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiment of the present application. The general-purpose processor may be a microprocessor or any conventional processor, etc. The steps of the method disclosed in combination with the embodiment of the present application may be directly embodied as being executed and completed by a hardware processor, or be executed and completed by a hardware and software module combination in the processor 1301. A software module may be located in a random access memory, a flash memory, a read only memory, a programmable read only memory, or an electrically erasable programmable memory, a register and other mature storage mediums in the art. The storage medium is located in the memory 1302, and the processor 1301 reads information in the memory 1302, and is combined with its hardware to complete the steps of the signal processing flow.

Figure 14:
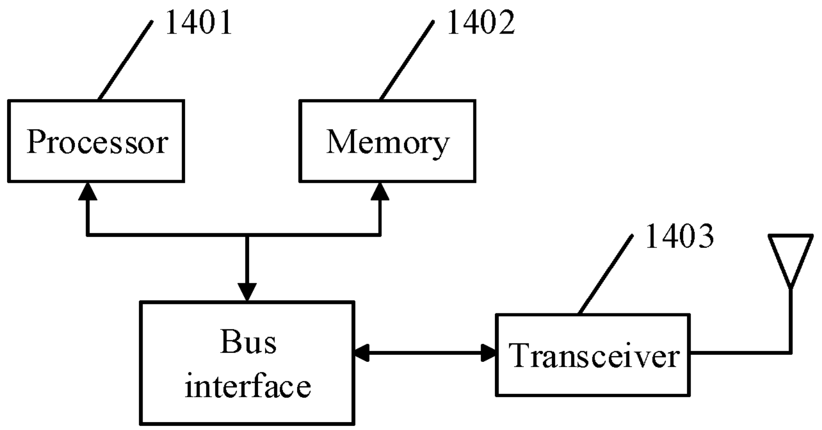
FIG. 14 is a second schematic structural diagram of a cell global identifier configuration apparatus on a source CU side provided by an embodiment of the present application.

As shown in FIG. 14, a cell global identifier configuration apparatus provided by an embodiment of the present application is applied to a source CU, and includes: a processor 1401, a memory 1402 and a transceiver 1403.

The processor 1401 is configured to read a program in the memory 1402 and execute the following: sending a migration request to a target CU to migrate a DU to the target CU, and the target CU configures a first global identifier for a cell managed by the DU, and the first global identifier is a global identifier used by the cell after the DU migrates to the target CU.

In a possible implementation, the processor 1401 is further configured to: receive a second interface message sent by the target CU; and obtain the first global identifier from the second interface message, and carry the first global identifier in a third interface message to be sent to the DU.

In a possible implementation, the second interface message includes a corresponding relationship between the first global identifier and a second global identifier, and the second global identifier is a global identifier used by the cell before the DU migrates to the target CU.

In a possible implementation, the processor 1401 is further configured to: receive, after sending the migration request to the target CU to migrate the DU to the target CU, a corresponding relationship between the first global identifier and a second global identifier sent by the DU or the target CU, and the second global identifier is a global identifier used by the cell before the DU migrates to the target CU; and indicate, when executing handover for each user equipment served by the cell, the first global identifier which is correct according to the second global identifier used by a cell to which the user equipment is currently connected.

The processor 1401 is responsible for managing a bus architecture and usual processing, and the memory 1402 may store data used by the processor 1401 during operation execution. The transceiver 1403 is configured to receive and send data under control of the processor 1401.

The bus architecture may include any quantity of interconnected buses and bridges, which are specifically linked together by various circuits of one or more processors represented by the processor 1401 and a memory represented by the memory 1402. The bus architecture may further link various other circuits such as a peripheral device, a voltage stabilizer and a power management circuit together, which are publicly known in the art and therefore are not further described herein. A bus interface provides an interface. The processor 1401 is responsible for managing the bus architecture and usual processing, and the memory 1402 may store data used by the processor 1401 during operation execution.

A flow disclosed in the embodiment of the present application may be applied to the processor 1401 or be implemented by the processor 1401. In an implementation process, all steps of a signal processing flow may be completed through an integrated logic circuit of hardware in the processor 1401 or in a software form. The processor 1401 may be a general-purpose processor, a digital signal processor, an application specific integrated circuit, a field-programmable gate array or other programmable logic devices, a discrete gate or a transistor logic device, a discrete hardware component, which can implement or execute all the methods, steps and logic block diagrams disclosed in the embodiment of the present application. The general-purpose processor may be a microprocessor or any conventional processor, etc. The steps of the method disclosed in combination with the embodiment of the present application may be directly embodied as being executed and completed by a hardware processor, or be executed and completed by a hardware and software module combination in the processor 1401. A software module may be located in a random access memory, a flash memory, a read only memory, a programmable read only memory, or an electrically erasable programmable memory, a register and other mature storage mediums in the art. The storage medium is located in the memory 1402, and the processor 1401 reads information in the memory 1402, and is combined with its hardware to complete the steps of the signal processing flow.

Embodiments of the present application further provide a readable storage medium, including: a memory, configured to store an instruction, and the instruction, when executed by a processor, causes an apparatus including the readable storage medium to complete the configuration method on the target CU side or the DU side or the source CU side described above.

The embodiments of the present application may be provided as methods, systems or computer program products. Therefore, the embodiments of the present application may adopt forms of full hardware embodiments, full software embodiments, or embodiments combining software and hardware aspects. In one embodiment, the embodiments of the present application may adopt a form of the computer program products implemented on one or more computer available storage mediums (including but not limited to a disk memory, CD-ROM, an optical memory and the like) containing computer available program codes.

The embodiments of the present application are described with reference to flow diagrams and/or block diagrams of the methods, the devices (systems), and the computer program products according to the embodiments of the present application. It should be understood that each flow and/or block in the flow diagrams and/or the block diagrams and combinations of the flows and/or the blocks in the flow diagrams and/or the block diagrams can be implemented by computer program instructions. These computer program instructions may be provided to a processor of a general-purpose computer, a special-purpose computer, an embedded processing machine or other programmable data processing devices to generate a machine, and the instructions, when executed by the processor of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generate an article of manufacture that includes a commander apparatus that implement the functions specified in one or more flows in the flow diagrams and/or one or more blocks in the block diagrams.

These computer program instructions may also be loaded to the computer or other programmable data processing devices, and a series of operating steps are executed on the computer or other programmable devices to generate computer-implemented processing, and the instructions executed on the computer or other programmable devices provide steps for implementing the functions specified in one or more flows in the flow diagrams and/or one or more blocks in the block diagrams.

What is claimed is:

1. A cell global identifier configuration method, performed by a target central unit (CU), and comprising:

configuring a first global identifier for a cell managed by a distributed unit (DU), wherein the first global identifier is a global identifier used by the cell after the DU migrates to the target CU; and sending the first global identifier to the DU;

wherein the sending the first global identifier to the DU, comprises:

sending a first interface message to the DU, wherein the first interface message comprises the first global identifier and a corresponding relationship between the first global identifier and a second global identifier, and the second global identifier is a global identifier used by the cell before the DU migrates to the target CU, and the second global identifier is obtained in a following mode: receiving a fourth interface message sent by the DU, and obtaining the second global identifier from the fourth interface message, wherein the fourth interface message is used to establish a logical interface between the DU and the target CU, and the first interface message is used to confirm the logical interface;

wherein after sending the first global identifier to the DU, the configuration method further comprises:

sending the corresponding relationship to the source CU, wherein when executing handover for each user equipment served by the cell, the source CU indicates the first global identifier according to the second global identifier used by a cell to which the user equipment is currently connected.

2. A cell global identifier configuration method, performed by a distributed unit (DU), and comprising:

receiving a first global identifier configured by a target central unit (CU) for a cell managed by the DU, wherein the first global identifier is a global identifier used by the cell after the DU migrates to the target CU;

wherein the receiving the first global identifier configured by the target CU for the cell managed by the DU, comprises:

receiving a first interface message sent by the target CU, wherein the first interface message carries the first global identifier and a corresponding relationship between the first global identifier and a second global identifier, and the second global identifier is a global identifier used by the cell before the DU migrates to the target CU;

after receiving the first global identifier configured by the target CU for the cell managed by the DU, the configuration method further comprises:

sending the corresponding relationship between the first global identifier and the second global identifier to the source CU, wherein when executing handover for each user equipment served by the cell, the source CU indicates the first global identifier according to the second global identifier used by a cell to which the user equipment is currently connected, wherein the second global identifier is a global identifier used by the cell before the DU migrates to the target CU.

3. A cell global identifier configuration method, performed by a source central unit (CU), and comprising:

sending a migration request to a target CU to migrate a distributed unit (DU) to the target CU for the target CU to configure a first global identifier for a cell managed by the DU, wherein the first global identifier is a global identifier used by the cell after the DU migrates to the target CU;

wherein after sending the migration request to the target CU to migrate the DU to the target CU, the configuration method further comprises:

receiving a second interface message sent by the target CU, and obtaining the first global identifier from the second interface message, and sending a third interface message to the DU by carrying the first global identifier in the third interface message, wherein the second interface message comprises a corresponding relationship between the first global identifier and a second global identifier and the second global identifier is a global identifier used by the cell before the DU migrates to the target CU;

and/or receiving a corresponding relationship between the first global identifier and a second global identifier sent by the DU or the target CU, and indicating, when executing handover for each user equipment served by the cell, the first global identifier which is correct according to the second global identifier used by a cell to which the user equipment is currently connected, wherein the second global identifier is a global identifier used by the cell before the DU migrates to the target CU.

4. A cell global identifier configuration apparatus, applied to a target central unit (CU), and comprising: a processor, a memory and a transceiver, wherein the processor is configured to read a program in the memory and execute the method according to claim 1.

5. A cell global identifier configuration apparatus, applied to a distributed unit (DU), and comprising: a processor, a memory and a transceiver, wherein the processor is configured to read a program in the memory and execute the method according to claim 2.

6. A cell global identifier configuration apparatus, applied to a source central unit (CU), and comprising: a processor, a memory and a transceiver, wherein the processor is configured to read a program in the memory and execute the method according to claim 3.

* * * * *